(12) United States Patent
Vimpari et al.

(10) Patent No.: US 7,948,958 B2
(45) Date of Patent: May 24, 2011

(54) COORDINATING UPLINK CONTROL CHANNEL GATING WITH CHANNEL QUALITY INDICATOR REPORTING

(75) Inventors: Anna-Mari Vimpari, Oulu (FI); Esa Malkamäki, Espoo (FI); Jukka Nauha, Oulu (FI); Karri Ranta-Aho, Espoo (FI)

(73) Assignee: Nokia Corporation, Espoo (FI)

( * ) Notice: Subject to any disclaimer, the term of this patent is extended or adjusted under 35 U.S.C. 154(b) by 915 days.

(21) Appl. No.: 11/499,846

(22) Filed: Aug. 4, 2006

(65) Prior Publication Data
US 2007/0030828 A1 Feb. 8, 2007

Related U.S. Application Data

(60) Provisional application No. 60/705,830, filed on Aug. 5, 2005.

(51) Int. Cl.
*H04B 7/216* (2006.01)
(52) U.S. Cl. ........ 370/342; 370/335; 370/347; 370/329; 370/337; 455/450; 455/67.11; 455/69; 455/522
(58) Field of Classification Search .................. 370/338, 370/335, 347, 469; 455/41.2, 522, 450–452.2, 455/69, 67.11
See application file for complete search history.

(56) References Cited

U.S. PATENT DOCUMENTS

| | | | |
|---|---|---|---|
| 6,714,526 B2 * | 3/2004 | Wei et al. ................... | 370/335 |
| 6,747,963 B1 | 6/2004 | Park et al. | |
| 6,967,935 B1 * | 11/2005 | Park et al. ................... | 370/320 |
| 6,993,294 B2 * | 1/2006 | Nobukiyo et al. ......... | 455/67.11 |
| 7,089,015 B2 * | 8/2006 | Fukui ........................... | 455/450 |
| 7,116,651 B2 * | 10/2006 | Hakkinen et al. ............ | 370/329 |
| 7,333,546 B2 * | 2/2008 | Kim et al. .................... | 375/242 |
| 7,414,989 B2 * | 8/2008 | Kuchibhotla et al. ........ | 370/329 |
| 7,426,177 B2 * | 9/2008 | Geile et al. ................... | 370/206 |
| 7,428,406 B2 * | 9/2008 | Raaf ............................ | 455/63.4 |
| 7,447,516 B2 * | 11/2008 | Heo et al. ..................... | 455/522 |
| 7,539,165 B2 * | 5/2009 | Toskala et al. ................ | 370/335 |
| 7,760,698 B2 * | 7/2010 | Chen et al. .................... | 370/342 |
| 7,787,430 B2 * | 8/2010 | Kaikkonen et al. ........... | 370/342 |
| 7,801,547 B2 * | 9/2010 | Wang et al. .................. | 455/522 |
| 7,817,604 B2 * | 10/2010 | Lindoff et al. ................ | 370/335 |
| 2002/0114311 A1 * | 8/2002 | Mazur et al. .................. | 370/347 |
| 2003/0073409 A1 | 4/2003 | Nobukiyo et al. | |
| 2003/0108013 A1 * | 6/2003 | Hwang et al. ................ | 370/335 |
| 2004/0004954 A1 * | 1/2004 | Terry et al. ................... | 370/349 |
| 2004/0219920 A1 * | 11/2004 | Love et al. .................... | 455/442 |
| 2004/0224677 A1 | 11/2004 | Kuchibhotla et al. | |

(Continued)

FOREIGN PATENT DOCUMENTS

EP 1 304 900 A2 4/2003

(Continued)

OTHER PUBLICATIONS

3GPP TR 25.899 V6.1.0 (Sep. 2004) Technical Specification Group Radio Access Network, High Speed Download Packet Access (HSDPA enhancements.
3GPP TR 25.840 V4.0.0 (Dec. 2003) Technical Specification Group Radio Access Network, Terminal Power Saving Features.

(Continued)

*Primary Examiner* — Sharad Rampuria (57) ABSTRACT

The specification and drawings present a new method, system, apparatus and software product for coordinating gating of an uplink (UL) control channel, e.g., a dedicated physical control channel (DPCCH), with UL reporting in regard to a downlink channel using, e.g., high speed uplink packet access (HSDPA) channel quality indicator (CQI) reporting.

40 Claims, 5 Drawing Sheets

U.S. PATENT DOCUMENTS

2006/0285558 A1   12/2006  Dottling et al.
2008/0205856 A1*   8/2008  Kim et al. .................... 386/124
2010/0260121 A1*  10/2010  Gholmieh et al. ............ 370/329

FOREIGN PATENT DOCUMENTS

| EP | 1521408 | 4/2005 |
|---|---|---|
| JP | 2003-199173 | 7/2003 |
| WO | WO 2000/062456 | 10/2000 |
| WO | WO2004062205 | 7/2004 |
| WO | WO 2004/100589 A2 | 11/2004 |
| WO | WO 2005034443 | 4/2005 |
| WO | WO2005109690 | 11/2005 |
| WO | WO2006036346 | 4/2006 |

OTHER PUBLICATIONS

"Gated Control Channel Transmission in WCDMA Forward Link" by Sami Salonen, Master's thesis, University of Oulu, Finland, 2002.
TR 101 112 V3.20 (Apr. 1998) Universal Mobile Telecommunications System (UMTS); Selection procedures for the choice of radio transmission.
3GPP TS 25.214 V6.6.0 (Jun. 2005) Technical Specification Group Radio Access Network; Physical Layer prodedures (FDD).
European Patent Office Search Report issued on Mar. 18, 2010, in corresponding EP patent application No. 06779932.0 (6 pages).
English language Abstract of JP2003199173 (1 page).

\* cited by examiner

COORDINATING UPLINK CONTROL CHANNEL GATING WITH CHANNEL QUALITY INDICATOR REPORTING

PRIORITY AND CROSS-REFERENCE TO RELATED APPLICATION

This application claims priority from U.S. Provisional Patent Application Ser. No. 60/705,830, filed on Aug. 5, 2005.

TECHNICAL FIELD

This invention generally relates to communications, e.g., wireless communications, and more specifically to coordinating gating of an uplink (UL) control channel with UL reporting in regard to a downlink channel.

BACKGROUND ART

In a UL direction from a user equipment (UE) to a network, also a signal on a high speed dedicated physical control channel (HS-DPCCH) can be transmitted. The HS-DPCCH signal typically carries 2 slots with channel quality indicator (CQI) reporting information and 1 slot with ACK/NACK information for the HSDPA (high speed download packet access). CQI transmission is typically periodic and normally independent of the high speed downlink shared channel (HS-DSCH) transmission activity. CQI reporting period can be controlled by a radio network controller (RNC) with possible values of 0, 2, 4, 8, 10, 20, 40, 80, and 160 ms. ACK/NACK is transmitted only as a response to a packet transmission on the HS-DSCH.

In an uplink (the UL direction), when no dedicated channels (DCHs) and no corresponding dedicated physical data channels (DPDCHs) are configured, all data is transmitted on an enhanced dedicated channel (E-DCH) which is mapped to an enhanced dedicated physical data channel (E-DPDCH). Control signaling associated with the E-DCH is transmitted on an enhanced dedicated physical control channel (E-DPCCH). The E-DPDCH and E-DPCCH can be discontinuous and are transmitted only when there is data to be transmitted and the transmission has been granted by the network. In the uplink, in addition to the E-DPDCH and E-DPCCH, a continuous dedicated physical control channel (DPCCH) and possibly a continuous or discontinuous dedicated physical control channel (e.g., an uplink high speed dedicated physical control channel, HS-DPCCH) for the HS-DSCH are transmitted.

A packet service session contains one or several packet calls depending on the application as described in ETSI standard, TR 101 112, UMTS 30.03 "Selection procedures for the choice of radio transmission technologies of the UMTS", version 3.2.0. The packet service session can be considered as an NRT (non-real time) radio access bearer duration and the packet call as an active period of packet data transmission. During the packet call several packets may be generated, which means that the packet call constitutes of a bursty sequence of packets. The burstiness is a characteristic feature of the packet transmission.

The arrival of session set-ups to the network can be modeled as a Poisson process. Reading time starts when the last packet of the packet call is completely received by the user and ends when the user makes a request for the next packet call. The HS-DSCH transmission in the downlink and E-DCH transmission in the uplink are discontinuous during the reading time (most of the reading time there is no HS-DSCH or E-DCH transmission). Note, that depending on the packet arrival intervals (among other things), there could be gaps in the E-DCH and HS-DSCH transmissions during a packet call but the E-DCH and HS-DSCH transmissions might also be continuous during the packet call. Thus, there can be some inactivity on the E-DCH also during a packet call.

For the E-DCH transmission, a grant is needed: a non-scheduled grant for non-scheduled MAC-d (MAC stands for medium access control) flows and a serving grant (and allowed active hybrid automatic repeat request (HARQ) process) for a scheduled transmission. In the case of the scheduled MAC-d flows, a Node B controls when a user equipment (UE) is allowed to send and thus Node B knows when the UE may send data. For the non-scheduled MAC-d flows, the network can allow a maximum number of bits that can be included in a MAC-e PDU (protocol data unit) for the given MAC-d flows. In case of 2 ms E-DCH TTI (transmission timing interval), each non-scheduled grant is applicable for a specific set of HARQ processes indicated by an RRC (radio resource control), and RRC can also restrict the set of HARQ processes for which scheduled grants are applicable. Also there must be a sufficient transmit power available in the UE to transmit the intended number of bits with the power level needed for intended reliability of the transmission, except for a minimum set (defined by the network), which defines a number of bits that can be transmitted on the E-DCH in the TTI also when there is not enough transmit power to maintain the intended reliability. (This minimum set for the E-DCH may only exist if there is no DCH configured for the connection.)

The UL DPCCH carries control information generated at layer 1 (physical layer). The layer 1 control information consists of, e.g., known pilot bits to support channel estimation for coherent detection, transmit power control (TPC) for DL DPCH (dedicated physical channel), optional feedback information (FBI) and optional transport format combination indicator (TFCI). Typically, the UL DPCCH is continuously transmitted (even if there is no data to be transmitted for certain time periods), and there is one UL DPCCH for each radio link. The continuous transmission is not a problem with circuit switched services, which are typically sent continuously. However, for bursty packet services, continuous DPCCH transmission causes a significant overhead. Note that DPCCH transmission is required whenever the E-DPDCH, E-DPCCH or HS-DPCCH is transmitted in the uplink. Without simultaneously transmitted DPCCH, the reception of the E-DPDCH, E-DPCCH or HS-DPCCH is not possible (there are no pilot bits for channel estimation on other channels).

The uplink capacity can be increased by decreasing a control overhead. One possibility for decreasing the control overhead is UL DPCCH gating (or discontinuous transmission), i.e., not transmitting signals on the DPCCH all the time.

Rationale for using gating includes (but is not limited to):
providing user equipment (UE) power savings and longer battery life;
providing interference reduction; and
providing higher capacity.

DISCLOSURE OF THE INVENTION

According to a first aspect of the invention, a method, comprises: scheduling a report signal comprising reporting information on a downlink channel and a discontinuous control signal for an uplink control channel by coordinating a timing relationship between the report signal and the discontinuous control signal using a predetermined criterion; and transmitting the report signal and the discontinuous control signal to a network element by a user equipment.

According further to the first aspect of the invention, the scheduling of the discontinuous control signal for the uplink control channel may depend on timing of the report signal using the predetermined criterion.

According further to the first aspect of the invention, the timing of the report signal may depend on the scheduling of the discontinuous control signal for the uplink control channel.

Still further according to the first aspect of the invention, the network element may be a Node B and the network element and the user equipment may be configured for wireless communications.

According further to the first aspect of the invention, the report signal may be transmitted on a high speed dedicated physical control channel.

According still further to the first aspect of the invention, the reporting information in the report signal comprising channel quality indicator reporting information. Further, the report signal may comprise the channel quality indicator reporting information may be scheduled and provided by the user equipment based on a high speed downlink shared channel signal received by the user equipment from the network element.

According further still to the first aspect of the invention, during the scheduling, a reporting period of the report signal may be changed by a preselected value after a preselected time period of a downlink inactivity and after a downlink activity is started, the reporting period may be changed to its initial value, wherein the initial value is a minimum value of the reporting period.

According yet further still to the first aspect of the invention, during the scheduling, the reporting period of the report signal may be increased by a preselected value after every the preselected time period of the downlink inactivity, wherein the reporting period cannot exceed a preselected maximum value.

Yet still further according to the first aspect of the invention, during the scheduling, the reporting period of the report signal may be increased to a preselected maximum value after the preselected time period of the downlink inactivity.

Still yet further according to the first aspect of the invention, during the scheduling, a reporting period of the report signal may be an average, a minimum or a maximum allowed CQI period in a randomized uplink transmission pattern.

Still further still according to the first aspect of the invention, the time instants of the discontinuous control signal may be the same as the time instants of the report signal.

According further still to the first aspect of the invention, a gating period of the discontinuous control signal may be equal to a minimum value of a reporting period of the report signal.

According yet further still to the first aspect of the invention, the discontinuous control signal may be excluded in time slots immediately following the report signal or preselected number of time slots after the report signal.

Yet still further according to the first aspect of the invention, a gating period of the discontinuous control signal may be equal to a minimum value of a reporting period of the report signal.

Still yet further according to the first aspect of the invention, the uplink control channel may be an uplink dedicated physical control channel.

Still further still according to the first aspect of the invention, the scheduling of the discontinuous control signal may depend on timing of data transmitted on an uplink data channel using a further predetermined criterion.

According further still to the first aspect of the invention, the scheduling using the coordinating may be provided by at least one of: a) the network element, and b) the user equipment.

According to a second aspect of the invention, a computer program product comprising: a computer readable storage structure embodying computer program code thereon for execution by a computer processor with the computer program code, wherein the computer program code comprises instructions for performing the first aspect of the invention, indicated as being performed by any component or a combination of components of the user equipment or the network element.

According to a third aspect of the invention, a user equipment, comprises: an uplink scheduling and signal generating module, for generating a report signal comprising reporting information regarding a downlink channel, for generating a discontinuous control signal for an uplink control channel, wherein scheduling of the report signal and the discontinuous control signal is provided by coordinating a timing relationship between the report signal and the discontinuous control signal using a predetermined criterion; and a receiving/transmitting/processing module, for transmitting the report signal and the discontinuous control signal to a network element.

Further according to the third aspect of the invention, the uplink scheduling and signal generating module may be configured to provide the scheduling using the coordinating of at least one of: the discontinuous control signal and the report signal.

Still further according to the third aspect of the invention, the scheduling using the coordinating may be provided by at least one of: a) the network element, and b) the uplink scheduling and signal generating module.

According further to the third aspect of the invention, the uplink control channel may be an uplink dedicated physical control channel.

According still further to the third aspect of the invention, the scheduling of the discontinuous control signal may depend on timing of data transmitted on an uplink data channel using a further predetermined criterion.

According yet further still to the third aspect of the invention, the user equipment may be configured for wireless communications.

According further still to the third aspect of the invention, the scheduling of the discontinuous control signal for the uplink control channel may depend on timing of the report signal using the predetermined criterion.

Yet still further according to the third aspect of the invention, the timing of the report signal may depend on the scheduling of the discontinuous control signal for the uplink control channel.

Still yet further according to the third aspect of the invention, the reporting information in the report signal may comprise channel quality indicator reporting information.

Still further still according to the third aspect of the invention, during the scheduling, a reporting period of the report signal may be changed by a preselected value after a preselected time period of a downlink inactivity and after a downlink activity is started, the reporting period may be changed to its initial value, wherein the initial value is a minimum value of the reporting period.

Yet still further according to the third aspect of the invention, during the scheduling, the reporting period of the report signal may be increased by a preselected value after every the preselected time period of the downlink inactivity, wherein the reporting period cannot exceed a preselected maximum value.

Still yet still further according to the third aspect of the invention, an integrated circuit may comprise the uplink scheduling and signal generating module and the receiving/transmitting/processing module.

According to a fourth aspect of the invention, a user equipment, comprises: means for signal generation, for generating a report signal comprising reporting information regarding a downlink channel, for generating a discontinuous control signal for an uplink control channel, wherein scheduling of the report signal and the discontinuous control signal is provided by coordinating a timing relationship between the report signal and the discontinuous control signal using a predetermined criterion; and means for receiving and transmitting, for transmitting the report signal and the discontinuous control signal to a network element.

According further to the fourth aspect of the invention, the means for signal generation may be configured to provide the scheduling.

According to a fifth aspect of the invention, a network element, comprises: a scheduling and generating module, for generating a downlink data signal; a transmitter block, for providing the downlink data signal to a user equipment; and a receiving block, for receiving a report signal comprising reporting information regarding a downlink channel transmitting the downlink data signal and a discontinuous control signal, wherein scheduling of the report signal and the discontinuous control signal is provided by coordinating a timing relationship between the report signal and the discontinuous control signal using a predetermined criterion.

According further to the fifth aspect of the invention, the scheduling and generating module may be configured to provide the scheduling using the coordinating of at least one of: the discontinuous control signal, and the report signal.

According to a sixth aspect of the invention, a communication system, comprises: a network element, for providing a downlink data signal; and a user equipment, for generating and transmitting to the network element a report signal which comprises reporting information regarding a downlink channel transmitting the downlink data signal and a discontinuous control signal for an uplink control channel, wherein scheduling of the report signal and the discontinuous control signal is provided by coordinating a timing relationship between the report signal and the discontinuous control signal using a predetermined criterion.

According further to the sixth aspect of the invention, the scheduling of the discontinuous control signal for the uplink control channel may depend on timing of the report signal using the predetermined criterion.

Further according to the sixth aspect of the invention, the timing of the report signal may depend on the scheduling of the discontinuous control signal for the uplink control channel.

Still further according to the sixth aspect of the invention, the reporting information in the report signal may comprise channel quality indicator reporting information.

According further to the sixth aspect of the invention, the scheduling using the coordinating may be provided by at least one of: a) the network element, and b) the user equipment.

MODES FOR CARRYING OUT OF THE INVENTION

A new method, system, apparatus and software product are presented for coordinating gating of an uplink (UL) control channel, e.g., a dedicated physical control channel (DPCCH), with UL reporting in regard to a downlink channel, e.g., high speed uplink packet access (HSDPA) channel quality indicator (CQI) reporting, for increasing capacity of HSUPA of communications, e.g., wireless communications. In other words, according to various embodiments of the present invention, scheduling a report signal comprising reporting information (e.g., CQI reporting) on a downlink channel and a discontinuous control signal (e.g., a DPCCH signal) for an uplink control channel (e.g., DPCCH) can be performed by coordinating a timing relationship between the report signal and the discontinuous control signal using a predetermined criterion.

According to an embodiment of the present invention, the CQI reporting timing and gated UL control channel transmission timing (or DPCCH transmission timing) could be tied to each other. The CQI transmission rate could be tied to an HS-DSCH transmission activity and the DPCCH transmission rate could be tied to E-DCH transmission activity using a predefined algorithm discussed below in detail.

Thus, according to an embodiment of the present invention, scheduling of the UL control channel such as dedicated physical control channel (DPCCH) can be performed in coordination with a rate of the CQI reporting using a predetermined criterion. In a special case of both HS-DSCH and E-DCH inactivity, the CQI reporting and DPCCH transmission time instants can be defined to be the same, when the lowest CQI reporting rate can be applied. Moreover, when there is an HS-DSCH (high speed downlink shared channel) transmission activity, the CQI reporting (and ACK/NACK transmission) on the HS-DPCCH is more frequent and the DPCCH must be anyway transmitted, whenever HS-DPCCH is transmitted. Consequently, the transmission rates might not need to be the same for the CQI reporting and the gated DPCCH transmission.

Thus, the CQI reporting time and rate could be tied to the DPCCH transmission times, if the DPCCH transmission is gated. Then the gating gain could be maximized. As discussed above (see 3GPP TR25.899), the CQI reporting can depend on the HS-DSCH transmission activity, e.g., a higher rate of the CQI reporting when the HS-DSCH transmission is present, and a lower rate when the HS-DSCH is inactive. In addition to that, it can be defined that the periodic CQI reporting can be dynamic, i.e., the period could become longer during a longer downlink data transmission (e.g., HS-DSCH) inactivity. The start of an additional CQI reporting after a long inactivity could be controlled with a low bit rate HS-DSCH transmission even if no recent CQI report is available.

According to an embodiment of the present invention, a DPCCH gating pattern can be applied, e.g., a DPCCH gating period (or a gating period in general) can be constant and equal to a minimum period of a CQI reporting signal. Alternatively, the DPCCH gating period can be constant and equal to a minimum period of a CQI reporting signal but excluded in time slots immediately following (or preselected number of slots after) the CQI reporting signal.

According to an embodiment of the present invention, the dynamic CQI period can be either an average, a minimum or maximum allowed CQI period in a randomized UL transmission pattern, if randomization is needed, e.g., due to EMC (electro-magnetic compatibility) problems. The start of additional CQI reporting after a long inactivity could be controlled with a low bit rate HS-DSCH transmission even if no recent CQI reporting is available.

If a static (with a constant rate) DPCCH gating pattern is applied, it can be defined that DPCCH transmissions right after (or x slots after) E-DCH or HS-DPCCH transmission could be ignored (at least in the single cell case). This is especially true if (non-periodic) ACK/NAK is transmitted on the HS-DPCCH.

The coordination of the DPCCH and CQI transmission patterns, e.g., gating patterns, patterns including timing (i.e., the time offset or starting time of the pattern) and possibly also rates, could be RNC controlled. RNC would define coordinated patterns (timings and rates) for the DPCCH and CQI transmissions. For example, when the DPCCH gating would be activated, the CQI reporting pattern (e.g., the timing and/or rate) would be redefined according to the desired DPCCH gating pattern (e.g., the timing and/or rate) or the DPCCH gating pattern (e.g., the timing and/or rate) would be defined according to the existing CQI reporting pattern (e.g., timing and/or rate). The basic (initial) patterns (e.g., timing and/or rate) could e.g., be defined to be the same (overlapping DPCCH and CQI transmissions), and the rules for dynamic behavior depending on the activity in the uplink or downlink such that the patterns would be coordinated even if the rates would depend on different activities (e.g., the CQI rate could depend on the DL data transmission activity and the DPCCH rate could depend on the UL data transmission activity). And if, e.g., the DPCCH transmission would be randomized and the CQI transmission not, the DPCCH and CQI patterns could be defined so, that the DPCCH and CQI transmissions overlap as much as possible.

Alternatively, the coordination of the DPCCH and CQI transmission (/gating) patterns (pattern including timing and possibly also rate) could be done autonomously at the UE according to predefined rules. E.g., the CQI transmission could be autonomously delayed (or advanced) to overlap with the closest DPCCH transmission, which is done according to the DPCCH gating pattern or due to the E-DCH transmission, if the delay (advance) would be at most x milliseconds (/subframes/slots).

It is noted that all embodiments of the present invention described above for the uplink control channel, e.g., the DPCCH, can be applied to any L1 control channel in the UL (carrying, e.g., pilot and/or power control information) used for, e.g., channel estimation and power control. It is also noted, that scheduling the discontinuous control signal can be performed by a user equipment or by a network element, according to embodiments of the present invention. Also, it is noted that various embodiments of the present invention recited herein can be used separately, combined or selectively combined for specific applications.

Figure 1:
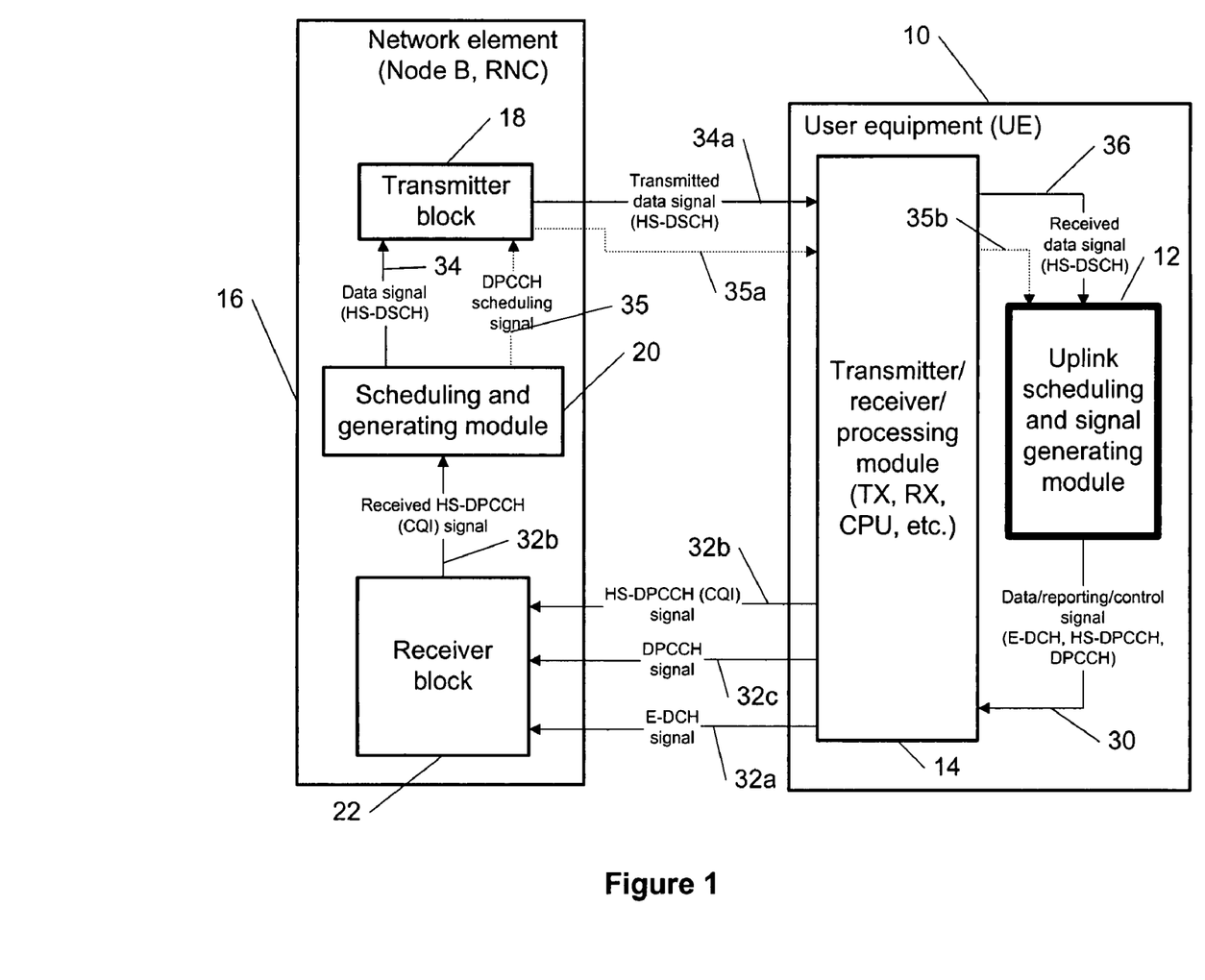
FIG. 1 is a block diagram of coordinating uplink (UL) dedicated physical control channel (DPCCH) gating with HSDPA (high speed uplink packet access) channel quality indicator (CQI) reporting, according to an embodiment of the present invention.

FIG. 1 shows a block diagram of an example among others which demonstrates coordinating uplink (UL) dedicated physical control channel (DPCCH) gating with HSDPA (high speed uplink packet access) channel quality indicator (CQI) reporting, according to an embodiment of the present invention.

In the example of FIG. 1, a user equipment 10 comprises an uplink scheduling and signal generating module 12 and a transmitter/receiver/processing module 14. Steps performed by the user equipment 10 related to the DPCCH gating can be coordinated and originated by the module 12. The user equipment 10 can be a wireless device, a portable device, a mobile communication device, a mobile phone, etc. In the example of FIG. 1, a network element 16 (e.g., a node B or a radio network controller, RNC) comprises a transmitter block 18, a scheduling and generating module 20 and a receiver block 22.

According to an embodiment of the present invention, the block 12 (the same is applicable to the block 20) can be implemented as a software or a hardware block or a combination thereof. Furthermore, the block 12 can be implemented as a separate block or can be combined with any other standard block of the user equipment 10 or it can be split into several blocks according to their functionality. The transmitter/receiver/processing block 14 can be implemented in a plurality of ways and typically can include a transmitter, a receiver, a CPU (central processing unit), etc. The module 14 provides an effective communication of the module 12 with the network element 16 as described below in detail. All or selected modules of the user equipment 10 can be implemented using an integrated circuit, and all or selected blocks and/or modules of the network element 16 can be implemented using an integrated circuit as well.

A downlink (DL) data signal 34a (e.g., HS-DSCH) is transmitted by the transmitter block 18 of the network element 16 to the transmitter/receiver/processing module 14 of the user equipment 10 and then forwarded (signal 36) to the module uplink scheduling and signal generating module 12. The module 12 provides a data/reporting/control signal 30, according to embodiments of the present invention, which are then forwarded (signals 32a, 32b and 32c) to the receiver block 22 of the network element 16. Specifically, the module 12 provides a data signal (e.g., an E-DCH signal 32a) and a report signal (e.g., an HS-DPCCH signal 32b) containing channel quality indicator (CQI) and/or acknowledgement (ACK) reporting feedback information for a downlink channel (e.g., the received data HS-DSCH signal 36). Also, the module 12 schedules a DPCCH signal for an uplink (UL) dedicated physical control channel (DPCCH) gated in coordination with (or depending on the timing of) said CQI reporting information, e.g., contained in the HS-DPCCH signal 32b using a predetermined criterion and optionally in coordination with (or depending on) data transmitted on an uplink data channel, e.g., the enhanced dedicated channel (the E-DCH signal 32a) using a further predetermined criterion.

It is also shown in FIG. 1 that the network element 16 can use (optionally) the received HS-DPCCH signal 32b for scheduling and providing a downlink data HS-DSCH signal 34. FIG. 1 further demonstrates (see signals 35, 35a and 35b) an embodiment wherein the scheduling of the DPCCH signal is performed by the network element 16 (e.g., by the block 20), according to an embodiment of the present invention. The signals 35, 35a and 35b are optional.

It is noted that the network element 16, for the purposes of understanding of various embodiments of the present invention, can be broadly interpreted such that the network element 16 can comprise features attributed to both the Node B and the radio network controller (RNC). Specifically, the module 20 can be located in the RNC (then the signaling from the RNC is forwarded to the user equipment by the Node B) or in the Node B, whereas the block 22 is located in the Node B.

Figure 2:
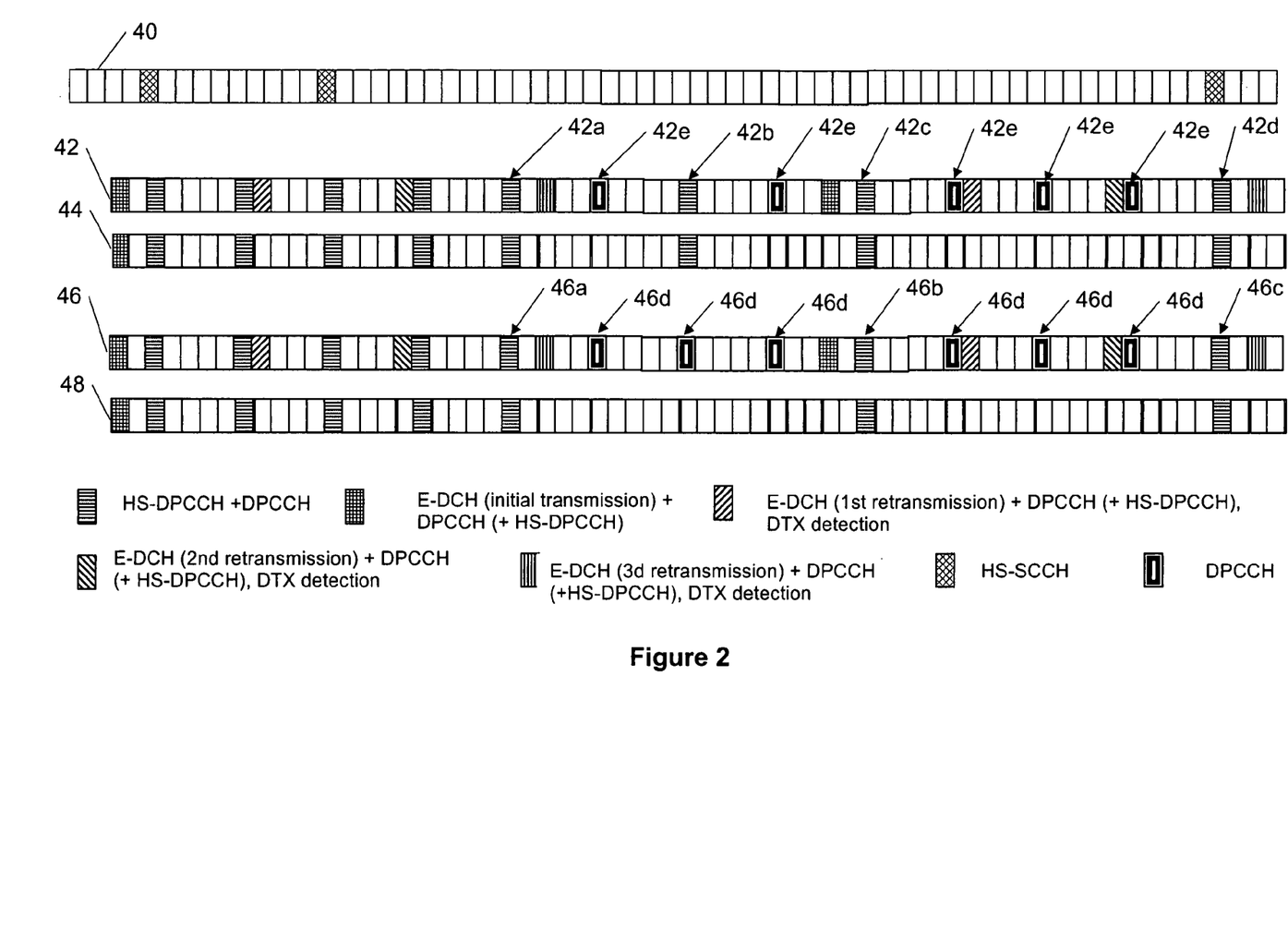
FIG. 2 is a diagram demonstrating examples of DPCCH gating patterns, according to an embodiment of the present invention.
Figure 3:
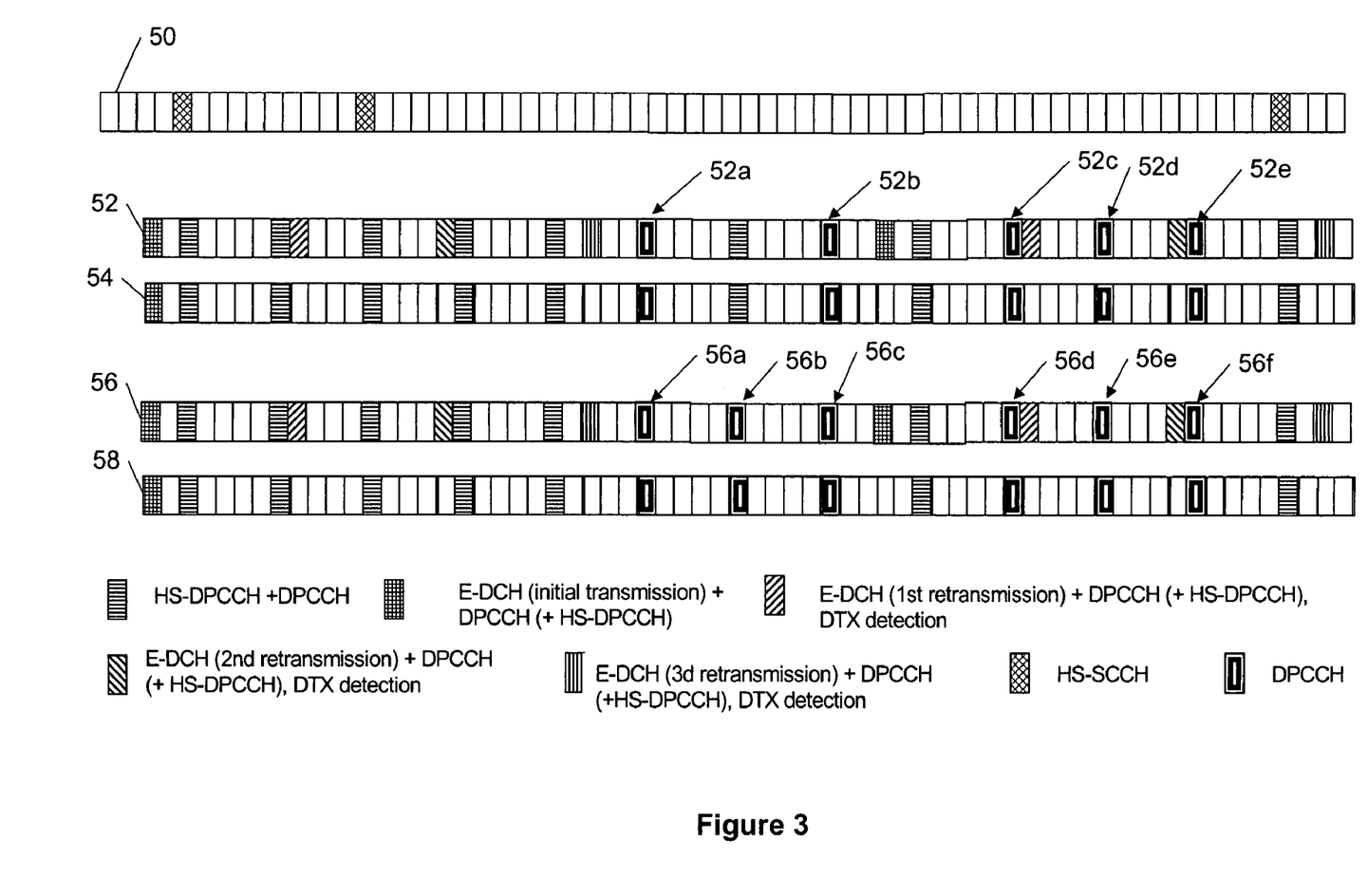
FIG. 3 is a diagram demonstrating further examples of DPCCH gating patterns, according to an embodiment of the present invention.
Figure 4:
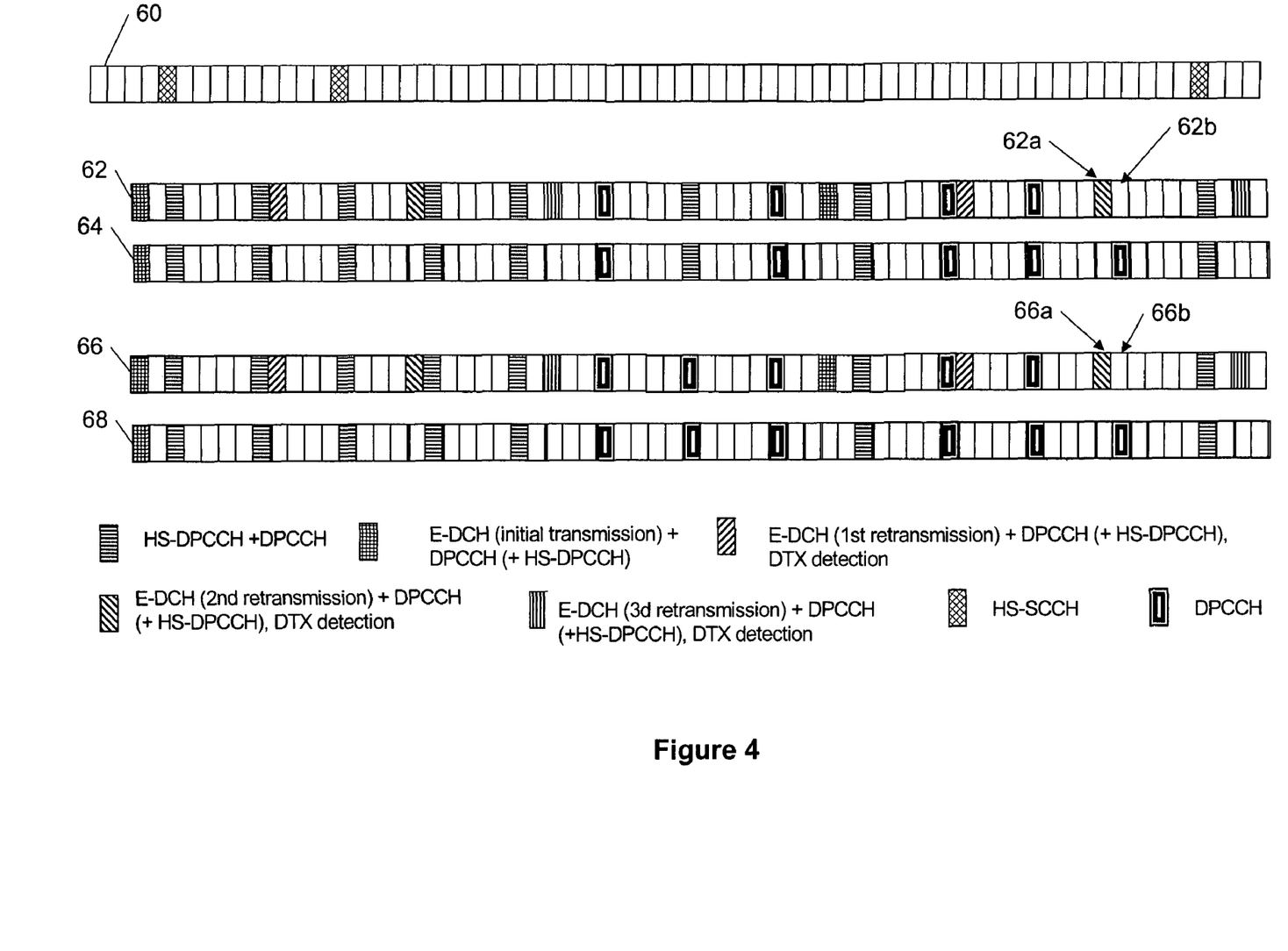
FIG. 4 is a diagram demonstrating additional examples of DPCCH gating patterns with a special rule, according to an embodiment of the present invention.
Figure 5:
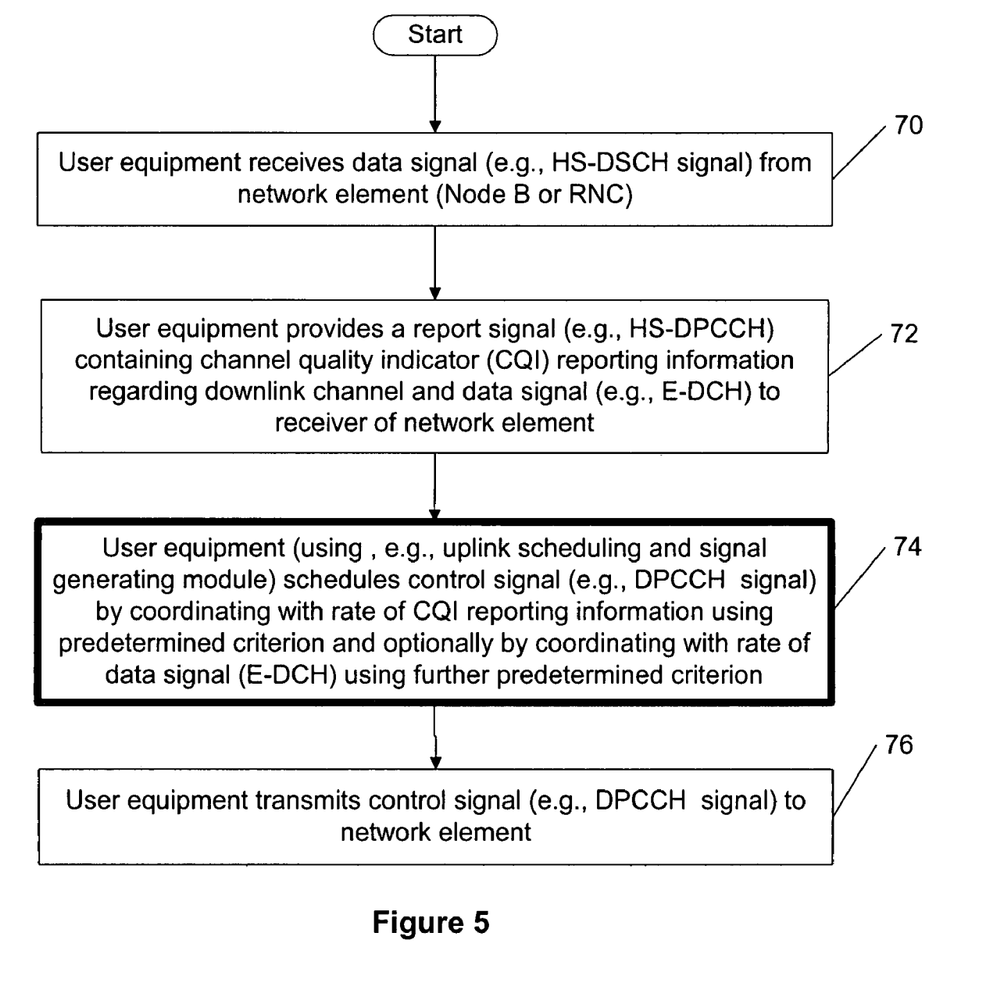
FIG. 5 is a flow chart illustrating coordination of uplink (UL) dedicated physical control channel (DPCCH) gating with HSDPA (high speed uplink packet access) channel quality indicator (CQI) reporting, according to an embodiment of the present invention.

FIG. 2 shows one example among others of a diagram demonstrating DPCCH gating patterns or equivalently discontinuous DPCCH transmission patterns, according to embodiments of the present invention. In FIG. 2 the HS-DPCCH transmission simultaneously with the E-DCH transmission is optional. A packet sequence 40 shows the HS-SCCH (high speed shared control channel for HS-DSCH) signal illustrating DL activity (the HS-DSCH signal is not shown). The granularity in this example is 2 ms (=3 slots), i.e., one rectangle showing transmission of some channel(s) has duration of 2 ms. It should, however, be noted that transmission of the CQI on the HS-DPCCH only takes 2 slots and transmission of the ACK/NAK only 1 slot. E-DCH TTI can be either 2 ms (as shown in FIGS. 3-5) or 10 ms (=15 consecutive slots). Furthermore, it should be noted that transmission of the HS-DPCCH is not necessarily time aligned with the transmissions of other uplink channels, i.e., HS-DPCCH slot boundaries are not the same as the slot boundaries for DPCCH, E-DPDCH and E-DPCCH. Thus, saying that the DPCCH is transmitted always when HS-DPCCH is transmitted requires some further definition: this means that some DPCCH slots are always transmitted together with the HS-DPCCH slots. For instance, if two CQI slots are transmitted, the DPCCH could be transmitted during all three slots that overlap with the CQI slots or only the two first DPCCH slots that overlap with CQI slots could be transmitted.

Packet sequences 42 and 44 correspond to a dynamic CQI period with a minimum or initial value (e.g., 10 ms) and a maximum value (e.g., 40 ms) between time slots containing CQI reporting information (e.g., transmitted on the HS-DPCCH), wherein the CQI reporting period is doubled (or changed by a preselected value) after every 2 periods (or after a preselected number of periods) of DL inactivity (which can be ascertained from the packet sequence 40). For example, the CQI reporting period between signals in time slots 42a and 42b, and 42b and 42c is doubled and the CQI reporting period between signals in time slots 42c and 42d is further doubled, since the downlink transmission inactivity continues. In the packet sequence 42 the DPCCH gating period is constant (10 ms) such that the DPCCH signals 42e are added between the time slots 42a, 42b, 42c and 42d, respectively. In the packet sequence 44 the DPCCH transmission follows exactly the CQI transmission and there are no additional DPCCH signals added. This could be, e.g., due to a longer DPCCH gating period than a CQI reporting period.

Packet sequences 46 and 48 correspond to the dynamic CQI period with the minimum or initial value (e.g., 10 ms) and the maximum value (e.g., 40 ms) between the time slots containing the CQI reporting information (transmitted in the HS-DPCCH), wherein the CQI reporting period is switched from the minimum (10 ms) to the maximum 40 ms during periods of the DL inactivity (which can be ascertained from the packet sequence 40). For example, the CQI reporting period between signals in time slots 46a and 46b, and 46b and 46c is switched to the maximum 40 ms from its initial value of 10 ms. In the packet sequence 46, the DPCCH gating period is constant (10 ms) such that the DPCCH signals 46e are added between the time slots 46a, 46b and 46c, respectively. In the packet sequence 48 the DPCCH transmission follows exactly the CQI transmission and there are no additional DPCCH signals added. This could be, e.g., due to a longer DPCCH gating period than the CQI reporting period.

It is noted, that according to an embodiment of the present invention, the network element 16 can be aware (or informed) with rules for determining the DPCCH gating period by the user equipment 10, which may partly eliminate the need for a continuous DTX (discontinuous transmission) detection by the network element 16.

FIG. 3 shows another example among others of a diagram demonstrating the DPCCH gating patterns, according to embodiments of the present invention. Again, the HS-DPCCH transmission simultaneously with the E-DCH transmission is optional. Packet sequence 50 shows the HS-SCCH (high speed shared control channel for HS-DSCH) signal illustrating DL activity (the HS-DSCH signal is not shown).

Again, packet sequences 52 and 54 correspond to the dynamic CQI period with the minimum or initial value (e.g., 10 ms) and the maximum value (e.g., 40 ms) between time slots containing CQI reporting information (e.g., transmitted on the HS-DPCCH), wherein the CQI reporting period is doubled (or changed by a preselected value) after every 2 periods (or after a preselected number of periods) of DL inactivity (which can be ascertained from the packet sequence 50). The packet sequence 52 is identical to the packet sequence 42 such that DPCCH signals 52a-52e are added to preserve constant DPCCH gating period. Similar addition of the DPCCH signals is implemented in the packet sequence 54 which differs the packet sequence 54 from the packet sequence 44.

Packet sequences 56 and 58 correspond to the dynamic CQI period with the minimum or initial value (e.g., 10 ms) and the maximum value (e.g., 40 ms) between the time slots containing the CQI reporting information (transmitted in the HS-DPCCH), wherein the CQI reporting period is switched from the minimum (10 ms) to the maximum 40 ms during periods of the DL inactivity (which can be ascertained from the packet sequence 50). Again, the packet sequence 56 is identical to the packet sequence 46 such that DPCCH signals 56a-56f are added to preserve constant DPCCH gating period. Similar addition of the DPCCH signals is implemented in the packet sequence 58 which differs the packet sequence 58 from the packet sequence 48.

FIG. 4 shows yet another example among others of a diagram demonstrating the DPCCH gating patterns with a special rule (explained below), according to embodiments of the present invention. Again, the HS-DPCCH transmission simultaneously with the E-DCH transmission is optional. A packet sequence 60 shows HS-SCCH (high speed shared control channel for HS-DSCH) signal in the DL illustrating DL activity (the HS-DSCH signal is not shown).

Packet sequences 64 and 68 are identical to the packet sequences 54 and 58 (see FIG. 3), respectively. The difference between packet sequences 62 and 52, and between 66 and 56 is due to a special rule: the DPCCH signal is excluded in a time slot immediately following (or preselected number of time slots after) said report signal (HS-DPCCH) containing the CQI reporting information and/or acknowledgement (ACK/NAK) for the HS-DSCH transmission or the E-DCH transmission. As seen in FIG. 4, the time slot 62b following the time slot 62a containing the E-DCH signal does not contain the DPCCH signal.

FIG. 5 is an example of a flow chart illustrating coordination of the uplink (UL) dedicated physical control channel (DPCCH) gating with the HSDPA (high speed uplink packet access) channel quality indicator (CQI) reporting, according to an embodiment of the present invention.

The flow chart of FIG. 5 only represents one possible scenario among others. The order of steps shown in FIG. 5 is not absolutely required, so generally, the various steps can be performed out of order. In a method according to an embodiment of the present invention, in a first step 70 the user equipment 10 receives the data signal (e.g., the HS-DSCH signal 34*a*) from the network element (Node B or RNC) 16. In a next step 72, the user equipment 10 provides the report signal (e.g., the HS-DPCCH signal 32*b*) containing the channel quality indicator (CQI) reporting information regarding the downlink channel and/or the acknowledgement and the UL data signal (e.g., the E-DCH signal 32*a*) to the receiver block 22 of the network element 16. In a next step 74, the user equipment 10 (using, e.g., the uplink scheduling and signal generating module 12) schedules the control signals (e.g., the DPCCH signal) by coordinating with the rate of reporting the CQI reporting information (or more generally by coordinating with the transmission of HS-DPCCH) using the predetermined criterion and optionally by coordinating with the rate or transmission of the data signal (E-DCH) using the further predetermined criterion. Finally, in a step 76, the user equipment 10 transmits the control signal (e.g., the DPCCH signal 32*c*) to the network element 16.

The transmission of the DPCCH should be coordinated with the transmission of HS-DPCCH including either the CQI or the ACK/NAK or both. Especially, if both HS-DPCCH (typically CQI in this case) and DPCCH are transmitted periodically, the transmissions should be coordinated, i.e., not to transmit DPCCH only unnecessarily if HS-DPCCH (together with the DPCCH) is transmitted shortly before or after that moment anyway. Thus, for instance if both HS-DPCCH (CQI) and DPCCH gating have periodicity of 10 ms, the DPCCH should be transmitted only together with the HS-DPCCH. This sounds obvious from the UE point of view but from the Node B point of view this may not be that obvious, especially in SHO (soft handover): only serving HSDPA cell receives the HS-DPCCH (CQI) whereas the DPCCH should be received by all Node Bs in the SHO active set. Thus the transmission timing of the DPCCH should preferably be known by all the Node Bs and thus coordinated with the HS-DPCCH transmission.

As explained above, the invention provides both a method and corresponding equipment consisting of various modules providing the functionality for performing the steps of the method. The modules may be implemented as hardware, or may be implemented as software or firmware for execution by a computer processor. In particular, in the case of firmware or software, the invention can be provided as a computer program product including a computer readable storage structure embodying computer program code (i.e., the software or firmware) thereon for execution by the computer processor.

It is to be understood that the above-described arrangements are only illustrative of the application of the principles of the present invention. Numerous modifications and alternative arrangements may be devised by those skilled in the art without departing from the scope of the present invention, and the appended claims are intended to cover such modifications and arrangements.

What is claimed is:

1. A method, comprising:
   scheduling a report signal and a discontinuous control signal for an uplink control channel by coordinating a timing relationship between said report signal and said discontinuous control signal using a predetermined criterion, the reporting signal containing information about a downlink channel, wherein the timing of the transmission of the reporting signal and the discontinuous signal is coordinated with each other so as to at least partly overlap, and wherein the transmission reporting frequency of the reporting signal is dependent on the activity of the downlink channel; and
   transmitting said report signal and said discontinuous control signal to a network element, wherein said report signal and said discontinuous control signal are transmitted on separate channels.

2. The method of claim 1, wherein said scheduling of said discontinuous control signal for said uplink control channel depends on timing of said report signal using said predetermined criterion.

3. The method of claim 1, wherein said scheduling the report signal comprises scheduling a periodic rate of reporting comprising reporting information about on the downlink channel based at least partly on whether transmission on the downlink channel is present, including using a higher periodic rate of reporting when the transmission on the downlink channel is present, and using a lower periodic rate of reporting when the transmission on the downlink channel is inactive.

4. The method of claim 1, wherein said network element is a Node B and said network element and said user equipment are configured for wireless communications.

5. The method of claim 1, wherein said report signal is transmitted on a high speed dedicated physical control channel.

6. The method of claim 1, wherein said reporting information in said report signal comprises channel quality indicator reporting information.

7. The method of claim 6, wherein said report signal comprising said channel quality indicator reporting information is scheduled and provided by the user equipment based on a high speed downlink shared channel signal received by said user equipment from said network element.

8. The method of claim 1, wherein, during said scheduling, a reporting period of said report signal is changed by a preselected value after a preselected time period of a downlink inactivity and after a downlink activity is started, said reporting period is changed to its initial value, wherein said initial value is a minimum value of said reporting period.

9. The method of claim 1, wherein, during said scheduling, a reporting period of said report signal is increased by a preselected value after every preselected time period of said downlink inactivity, wherein said reporting period cannot exceed a preselected maximum value.

10. The method of claim 1, wherein, during said scheduling, a reporting period of said report signal is increased to a preselected maximum value after a preselected time period of said downlink inactivity.

11. The method of claim 1, wherein said transmitting said report signal and said discontinuous control signal comprises transmitting said report signal and said discontinuous control signal for an uplink control channel from user equipment to a network element based at least partly on the periodic rate of reporting of the report signal in relation to the transmission activity of said discontinuous control signal, so as to coordinate the timing of the transmission of the reporting signal and the discontinuous signal with each other.

12. The method of claim 1, wherein time instants of said discontinuous control signal are the same as the time instants of said report signal.

13. The method of claim 1, wherein a gating period of said discontinuous control signal is equal to a minimum value of a reporting period of said report signal.

14. The method of claim 1, wherein said discontinuous control signal is excluded in time slots immediately following said report signal or in a preselected number of time slots after said report signal.

15. The method of claim 14, wherein a gating period of said discontinuous control signal is equal to a minimum value of a reporting period of said report signal.

16. The method of claim 1, wherein said uplink control channel is an uplink dedicated physical control channel carrying at least pilot bits.

17. The method of claim 1, wherein said scheduling of said discontinuous control signal depends on timing of data transmitted on an uplink data channel using a further predetermined criterion.

18. The method of claim 1, wherein said scheduling using said coordinating is provided by at least one of:
said network element, and
said user equipment.

19. A computer readable storage structure embodying computer a program code thereon for execution by a computer processor with said computer program code, wherein said computer program code comprises instructions for performing the method of claim 1.

20. A user equipment, comprising:
an uplink scheduling and signal generating module, configured to schedule a report signal and a discontinuous control signal for an uplink control channel by coordinating a timing relationship between said report signal and said discontinuous control signal using a predetermined criterion, the reporting signal containing information about a downlink channel, wherein the timing of the transmission of the reporting signal and the discontinuous signal is coordinated with each other so as to at least partly overlap, and wherein the transmission reporting frequency of the reporting signal is dependent on the activity of the downlink channel; and
a receiving/transmitting/processing module, configured to transmit said report signal and said discontinuous control signal to a network element, wherein said report signal and said discontinuous control signal are transmitted on separate channels.

21. The user equipment of claim 20, wherein the uplink scheduling and signal generating module is configured to provide said scheduling by coordinating said discontinuous control signal and said report signal so as to at least partly overlap.

22. The user equipment of claim 20, wherein said scheduling using said coordinating is provided by at least one of:
said network element, and
the uplink scheduling and signal generating module.

23. The user equipment of claim 20, wherein said uplink control channel is an uplink dedicated physical control channel.

24. The user equipment of claim 20, wherein said scheduling of said discontinuous control signal depends on timing of data transmitted on an uplink data channel using a further predetermined criterion.

25. The user equipment of claim 20, wherein said user equipment is configured for wireless communications.

26. The user equipment of claim 20, wherein said scheduling of said discontinuous control signal for said uplink control channel depends on timing of said report signal using said predetermined criterion.

27. The user equipment of claim 20, wherein said scheduling the report signal comprises scheduling a periodic rate of reporting comprising reporting information about on the downlink channel based at least partly on whether transmission on the downlink channel is present, including using a higher periodic rate of reporting when the transmission on the downlink channel is present, and using a lower periodic rate of reporting when the transmission on the downlink channel is inactive.

28. The user equipment of claim 20, wherein said reporting information in said report signal comprises channel quality indicator reporting information.

29. The user equipment of claim 20, wherein, during said scheduling, a reporting period of said report signal is changed by a preselected value after a preselected time period of a downlink inactivity and after a downlink activity is started, said reporting period is changed to its initial value, wherein said initial value is a minimum value of said reporting period.

30. The user equipment of claim 20, wherein, during said scheduling, a reporting period of said report signal is increased by a preselected value after every preselected time period of said downlink inactivity, wherein said reporting period cannot exceed a preselected maximum value.

31. The user equipment of claim 20, wherein an integrated circuit comprises the uplink scheduling and signal generating module and the receiving/transmitting/processing module.

32. A user equipment, comprising:
means for scheduling and signal generation, for scheduling a report signal and a discontinuous control signal for an uplink control channel by coordinating a timing relationship between said report signal and said discontinuous control signal using a predetermined criterion, the reporting signal containing information about a downlink channel, wherein the timing of the transmission of the reporting signal and the discontinuous signal is coordinated with each other so as to at least partly overlap, and wherein the transmission reporting frequency of the reporting signal is dependent on the activity of the downlink channel; and
means for receiving and transmitting, for transmitting said report signal and a discontinuous control signal to a network element, wherein said report signal and said discontinuous control signal are transmitted on separate channels.

33. The user equipment of claim 32, wherein the means for signal generation is configured to provide said scheduling.

34. A network element, comprising:
a scheduling and generating module, configured to generate a downlink data signal;
a transmitter block, configured to provide said downlink data signal on a downlink channel to a user equipment; and
a receiving block, configured to receive a report signal and a discontinuous control signal for an uplink control channel by coordinating a timing relationship between said report signal and said discontinuous control signal using a predetermined criterion, the reporting signal containing information about a downlink channel, wherein the timing of the transmission of the reporting signal and the discontinuous signal is coordinated with each other so as to at least partly overlap, and wherein the transmission reporting frequency of the reporting signal is dependent on the activity of the downlink channel.

35. The network element of claim 34, wherein the scheduling and generating module is configured to provide said scheduling by coordinating said discontinuous control signal and said report signal so as to at least partly overlap.

36. A communication system, comprising:
a network element, configured to provide a downlink data signal on a downlink channel; and
a user equipment, configured to schedule a report signal and a discontinuous control signal for an uplink control channel by coordinating a timing relationship between said report signal and said discontinuous control signal using a predetermined criterion, the reporting signal containing information about a downlink channel, wherein the timing of the transmission of the reporting signal and the discontinuous signal is coordinated with each other so as to at least partly overlap, and wherein the transmission reporting frequency of the reporting signal is dependent on the activity of the downlink channel.

37. The system of claim 36, wherein said scheduling of said discontinuous control signal for said uplink control channel depends on timing of said report signal using said predetermined criterion.

38. The system of claim 36, wherein said report signal and said discontinuous control signal are transmitted on separate channels.

39. The system of claim 36, wherein said reporting information in said report signal comprises channel quality indicator reporting information.

40. The system of claim 36, wherein said scheduling using said coordinating is provided by at least one of: said network element, and said user equipment.

* * * * *